Nov. 26, 1968 J. LLACER 3,413,528

LITHIUM DRIFTED SEMICONDUCTOR RADIATION DETECTOR

Filed March 3, 1966 2 Sheets-Sheet 1

INVENTOR.
JORGE LLACER

BY Roland A. Anderson
Attorney

*INVENTOR.*

JORGE LLACER

*BY*

Roland A. Anderson
Attorney

United States Patent Office 3,413,528

Patented Nov. 26, 1968

3,413,528
LITHIUM DRIFTED SEMICONDUCTOR RADIATION DETECTOR

Jorge Llacer, Stanford, Calif., assignor to the United States of America as represented by the United States Atomic Energy Commission Filed Mar. 3, 1966, Ser. No. 533,381
5 Claims. (Cl. 317—234)

ABSTRACT OF THE DISCLOSURE

A method for producing a lithium drifted semiconductor radiation detector by cutting a U-shaped cross section groove defining a closed figure in one face of the detector.

This invention relates to radiation detectors and more particularly to lithium drifted silicon radiation detectors. The invention described herein was made in the course of, or under a contract with the U.S. Atomic Energy Commission.

In the field of nuclear energy a need exists for radiation detectors for detecting and analyzing radiation of nuclear particles. Various proposals have been made and used for this purpose, such as the lithium drifted silicon radiation detectors described in U.S. Patent No. 3,272,668, issued Sept. 13, 1966, and assigned to the assignee of this invention. These detectors comprise a wafer of silicon having at one plane surface thereof a negative electron donor region having many free electrons and practically no free holes, hereinafter call an n region or layer; at the opposite plane surface thereof a lithium drifted or compensated positive acceptor hole region having many free holes and practically no free electrons, hereinafter called a p region or layer; and interposed between the n and p regions an intrinsic or insulator region containing almost no free positive or negative carriers, hereinafter called an i region or layer.

The heretofore known lithium drifted detectors have been useful and can accomplish the desired detection. However, they have often produced leakage currents in excess of the bulk generated current and they have produced surface breakdown at relatively low reverse bias voltages. Moreover, these detectors have been unstable or have had high ambient sensitivity, undesirable n-type conductive layers, or other undesirable surface effects or surface channels that have required complicated control means, such as guard rings, silicon dioxide passivation and/or low temperature operation. It has been additionally advantageous to provide a practical, efficient and easily reproducible method of making these detectors and of providing improved geometry, and good charge collection with short clipping times.

It is an object of this invention, therefore, to provide a lithium drifted silicon radiation detector with low leakage currents and noise by increasing the resistivity of the surface n layer;

It is also an object of this invention to increase the resistivity of the surface n layer of a lithium drifted radiation detector by increasing the magnitude of the internal fields normal to that surface;

It is another object of this invention to increase the magnitude of the field normal to the exposed junction surface by specific geometric shaping of the Si crystal so that, after the Li drifting process has been completed, regions of high fields exist within the compensated region;

It is a further object to provide good charge collection with short clipping times in a lithium drifted radiation detector;

It is a further object of this invention to provide an improved radiation detector and a practical, efficient and easily reproducible method of making the same.

It is still a further object to maintain low noise at high bias voltages in lithium drifted radiation detectors.

The foregoing objects are achieved by providing a wafer of silicon having a first plane surface and a second surface parallel thereto, an n layer forming said first surface, a p layer contiguous with said second surface, and an i layer interposed between said n and p layers, said p layer extending substantially from said first surface to said second surface and forming a groove in said first surface adjacent said layer and a portion of said i layer. With the proper selection of groove, n, i and p layers the geometry thereof and method of making the same, the desired economical and practical lithium drifted silicon radiation detector is provided.

The above and further novel features and objects of this invention will appear more fully from the following detailed description when the same is read in connection with the accompanying drawings. It is to be expressly understood, however, that the drawings are not intended as a definition of the invention but are for the purpose of illustration only.

In the drawings where like parts are referenced alike:

The detector of this invention is useful in detecting nuclear particles, such as those detected by the lithium drifted silicon detector described in the above mentioned copending patent application by Miller et al. In this copending application a carefully controlled lithium alloyed n-region is formed in a silicon diode crystal by evaporating pure lithium onto a p-type silicon semiconductor from a lithium metal source. Some of the lithium atoms from the alloyed n-region are drifted into the p-region by a reverse bias source whereby the lithium impurity concentration compensates for the p-type impurity concentration, e.g., boron doped impurities, in a portion of the p-region, and forms a depletion or compensated region. In detecting the nuclear particles, the particles pass through the thin n-region and penetrate the depleted i layer to leave a trail of hole-electron pairs, which are swept out due to the presence of an electric field supplied by a reverse bias source. The tendency of the pairs to recombine is forbidden by momentum-energy conservation in a perfect silicon lattice so that the application of an electric field by a reverse bias source moves the electrons toward the n region and moves the holes toward the p region, it being noted that the electrons move faster than the holes by a factor of two or three. The resulting quantities of charge flow into a conventional external circuit, for example, having a clipper and multi-channel pulse-height analyzer, which indicates the number and energy of the penetrating particles, since each particle produces a pulse, the height of which corresponds to the particle energy. In this regard the i region is thick enough to stop the particle to be detected and the n region is very thin (e.g., 50≈microns thick) so that the particles impinging on the doped face pass right through the thin n layer and deposit only a very small amount of energy in the n-layer because it is so thin.

Figure 1:
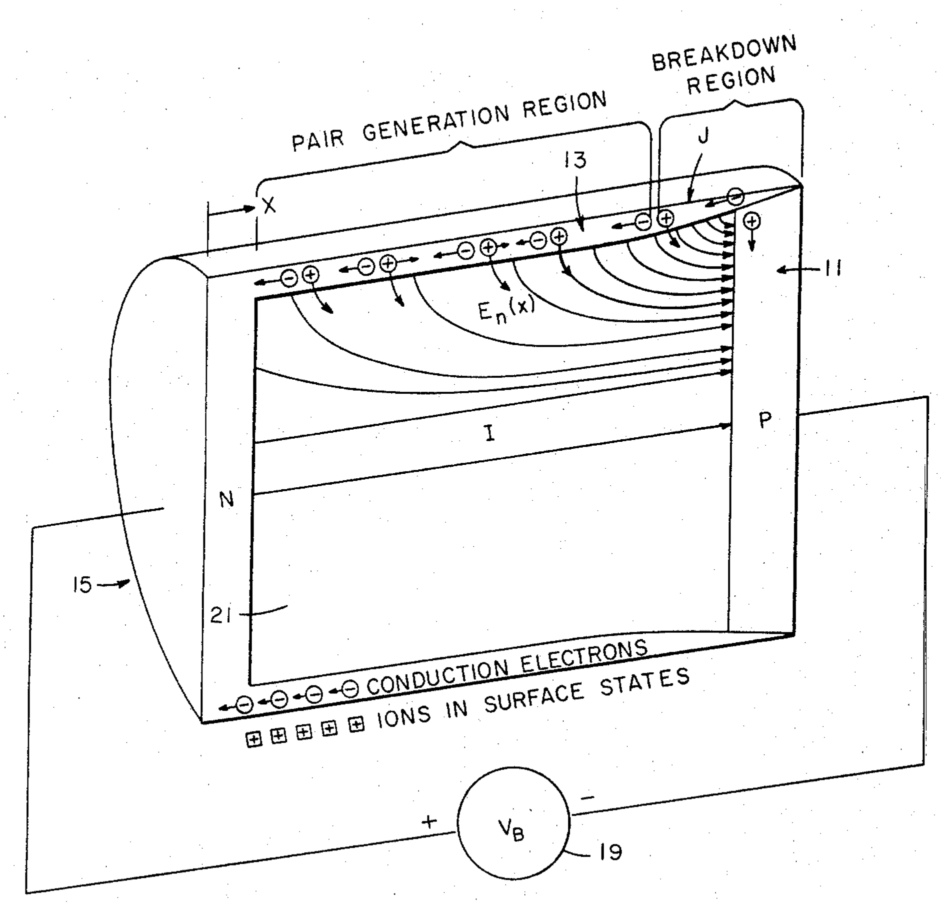
FIGURE 1 is a partial schematic view of a typical lithium drifted semiconductor radiation detector.

In understanding the principles of this invention wherein the structure involved is a p-i-n junction in which part of the p type material has been left uncompensated, reference is made to FIG. 1. This figure illustrates the fact that the conductance of the surface (n) layer 13 in this p-i-n lithium drifted semiconductor detector 15 is a function of the magnitude of the internal electric field normal to that surface represented by $E_n$ in the figure. It is noted that this conductance changes slowly at low normal fields, but increases rapidly above a certain value of normal field. The primary surface leakage current was found to originate in the vicinity of the i-p boundary J in the region labelled "breakdown region." More specifically, it has been found that the origin of most of this leakage and the high fields, is at the junction J between the n-type inversion layer 13 in the p-material 11 and the p material itself. In this regard there can be several volts between the channel 13 and the p-type bulk material 11 under it. In general, this voltage is found to depend very much on surface treatment and bias voltage from the source 19. Since there is no intrinsic region 21 in that part of the device 15 to separate the n layer 13 from the p side 11 of the diode 15, the fields can be higher than anywhere along the surface of the device. Moreover, this above-mentioned junction J has a low breakdown voltage, that likewise is a sensitive function of ambient conditions and chemical treatment.

Figure 2:
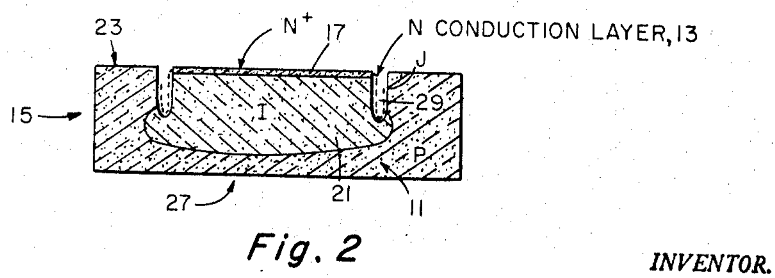
FIGURE 2 is a partial cross-section of the lithium drifted semiconductor radiation detector of this invention.

For a given chemical treatment and temperature, it has been found that there is one variable that can be controlled, namely the resistance of the surface 13 on the compensated region 21. Referring to FIG. 2, in accordance with this invention, the resistance of the surface 13 of the compensated region 21 is increased by a geometrical configuration of the crystal wafer 15 that results in high fields normal to surface 13 of the compensated region 21 for any given bias voltage from source 19. With higer surface resistance between the Li rich side 17 and the p side 11 of the device 15, the voltage appearing across the sensitive junction J is reduced. To this end i layer 21 is sandwiched between an n layer 17 of diode 15 and p layer 11 forming the opposite parallel surface 27 of diode 15 and extending from surface 23 to surface 27 to form a U-shaped p region around groove 29 in surface 23 that extends part way into i layer 21. Advantageously, surfaces 23 and 27 are flat and parallel with a separation of at least two millimeters therebetween. Also, the i region 21 terminates a distance of at least about 1 millimeter from the p surface 27 and the p region 11 extends from surface 27 to surface 23 in a U-shaped cross-section that surrounds groove 29 extending from surface 23 to about one-half the depth of i region 21. Additionally, the groove 29 is advantageously cut with an abrasive jet in a U or rounded V-shaped cross-section prior to the lithium drifting process whereby the intrinsic or compensated region 21 spreads out in a curl a small distance beyond the bottom of the groove 29.

Figure 3:
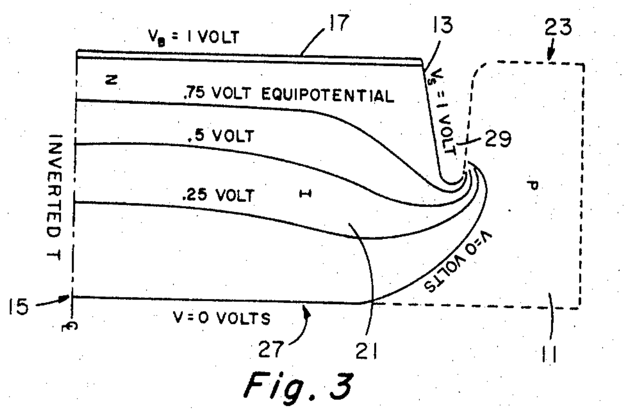
FIGURE 3 is an enlarged view of the detector of FIG. 2, showing equipotential voltage lines.

A numerical calculation of normal fields for the described detector 15 of this invention, with the geometry of the lithium compensated region 21 taken from actual drifting profiles (as determined by copper plating), is shown in FIG. 3. The diameter of the active area in accordance with one diode 15 is 13 mm., and the drifted depth is 4.5 mm. The boundary values taken were: p side 11 at zero potential, lithium side 17 at 1 volt, and the conduction layer 13 in a low resistance condition, with potential equal to the inside 13 potential. FIGURE 3 also shows equipotential lines in the interior of the diode detector 15.

The magnitude of the described normal fields of the device of this invention reveals a region of high fields near the i-p boundary J that extends over the whole curled portion of the compensated region 21 extending beyond the bottom of groove 29. This forces the surface 13 at that region to be of high resistance and allows operation at high bias before surface breakdown occurs. In many actual devices, for example, the surface breakdown voltage was at least 150 to 200 volts per mm. of drifted region i. Additionally, it has been found that these devices with high fields at a given voltage bias will collect surface generated carriers efficiently, and this efficiency is much better than the efficiency at the same bias in the low field devices known heretofore. The cause for this lies in the technique of making the detectors 15 and the grooves 29 of this iavention as described in more detail hereinafter. Referring further to the high internal fields of this invention it has been found that they allow high operating voltages, which also speeds the collection of the carriers and improves resolution for high energy gamma rays, particularly in cooled detectors 15.

Figure 4:
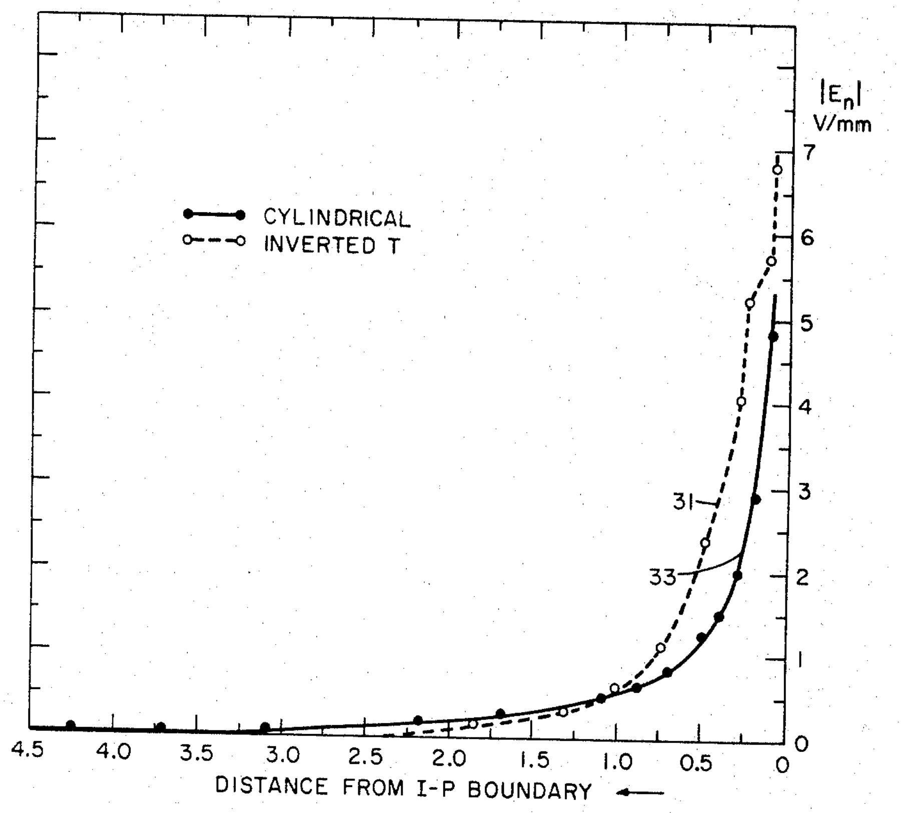
FIGURE 4 is a graphic plot of the normal electric fields of the detector of FIGURE 2 vs. distance from the i–p boundary.

A plot of the normal electric fields versus distance from the i-p boundary J, which is shown in FIGURE 4 by line 31, also illustrates that in all the diode 15, except near the i-p boundary J, the fields are higher than for conventional devices illustrated by line 33. Moreover, the channels (see channel 13) have a high resistance so as to be able to withstand high voltage before surface breakdown. Thus, the device of this invention, with high breakdown voltage, can be used for nuclear spectrometry with high bias and short clipping time constants. Additionally, the presence of a slowly rising shot noise up to the breakdown voltage, improves the resolution approximately as the square root of the maximum applicable bias for a given depletion depth. In this regard, it is noted from the above that the requirements of low leakage current for bias below surface breakdown and high surface breakdown voltages are not conflicting for the device of this invention, whereas they are conflicting requirements in the detectors known heretofore. In this regard it is noted, however, that collection from the surface begins to be efficient when normal fields are of a magnitude of approximately 30 to 50 v./mm. Also, for that magnitude of fields the conductance of the surface begins to decrease. Moreover, the normal fields do not seem to increase above 95 v./mm., so that the channel changes resistivity considerably with a change of normal field between 10 and 100 v./mm.

The detector 15 of this invention also does not have an n region covering the top surface 23 of the detector, which is in contrast to the heretofore known detectors which have an n region extending over the whole top surface. To this end, excess n region is removed from detector 15 by etching or jet blasting whereby the N layer 13 is confined to the central portion P of the detector confined by groove 29. This improves chemical stability.

In making the detector 15 of this invention p type base material, having a resistivity of from about 300Ω·cm. to about 800Ω·cm., is vapor coated with lithium metal. The lithium is alloyed into a portion of the p silicon and later drifted by reverse biasing with a constant wattage supply while Joule heat generated in the detector by reverse biasing is removed with a vapor phase coolant in which the semiconductor is immersed. Advantageously this wattage supply is a capacitor that is repeatedly discharged into the detector in constant energy pulses and the coolant is maintained near its boiling point near the surface of the detector. The annular groove 29 is cut, for example, with an abrasive jet after lithium coating and before alloying whereby the groove has a U-shaped cross-section free from lithium. A rounded V-shaped groove 29 may also be used, which is made with this jet so that the curved bottom of the groove 29 corresponds in cross-section to the bottom of the above-described U-shaped groove 29.

The bottom of groove 29 is made so that its depth corresponds to one-half the thickness of the i region 21. To this end an electrical potential source, such as the described drifting source, applies a reverse bias to the coated base material and lithium drifting proceeds as described. The drifting in accordance with this invention makes an i layer 21 whose depth extends one-half its total width below the plane passing through the bottom of groove 29. Also, the drifting takes place so that 1 mm. or more of p material remains uncompensated and the remaining P region extends across the wafer on one side from edge to edge and in a U shaped configuration from one side to the other side of said wafer around said groove. After drifting to the appropriate depth the n material outside the groove 29 is carefully removed, such as by etching and/or jet blasting. A chemical treatment then stabilizes the detector, wherein the finished dimension of the detector in one operable embodiment provides a total detector thickness of at least 2 mm. and a total p layer thickness under the i layer of 1 mm. or more.

Detectors in accordance with this invention were made with detector thicknesses of 2 mm., 3 mm., and 4 mm. In each case it was found advantageous to have about 1 mm. of p material remaining after drifting under the i layer since this configuration has less leakage current $I_L$ in $\mu$A than when more uncompensated material under the i layer is left. $I_L$ generates shot noise with a white spectrum. Shot noise $I_c$ compares with FWHM or noise referred to the input of a conventional electronic system used in spectrometry due to the leakage current of the detector:

$$\frac{FWHM}{(I_L)1/2} \approx 30 \frac{keV}{(\mu A)} 1/2$$

A reproducible stable chemical treatment for producing an ambient stable detector 15 of this invention is as follows: After the device has been etched and protective tapes or waxes have been thoroughly removed by a wax solvent, the wafer 15 is carefully cleaned with ultrasonic agitation in a good solvent, such as trichloroethylene or Inhibisol, followed successively by methanol and de-ionized water. After drying, the wafer is placed in $HNO_3$, 70% concentration, for a few minutes to oxidize the wafer surface. This is quenched with de-ionized water. A jet of clean, dry nitrogen then dries the wafer after which 50% HF removes the oxide surface in about one minute. A methanol bath quenches the HF and to this end two successive boils in clean methanol and drying and cooling in air are used.

This invention has the advantage of providing a practical, and efficient lithium drifted semi-conductor detector, and easily reproducible method for making the same, for the detection of nuclear particles over a wide energy range with low noise, surface breakdown, and good charge generation. The controlled geometry of the detector of this invention and the method of making the same avoids the use of complicated and expensive control means, such as guard rings, silicon passivation and the like, and thereby produces high resistivity in the surface n layer and high internal fields normal to the surface n layer in the compensated i layer.

What is claimed is:

1. A method for producing a semi-conductor radiation detector, comprising coating one side of a wafer of p-silicon having flat parallel sides with lithium metal to form an n-region thereon, cutting a U cross-section groove defining a closed figure in said one side of the wafer, applying a constant wattage reverse bias between said sides to drift a portion of said lithium into a portion of said p-silicon to form an i region intermediate said sides between said n region and said p silicon with said i region extending around the bottom of said groove in a curl with said groove depth extending along said i region half the width of said i region, removing said lithium coating from said wafer except on the n region and chemically stabilizing said wafer whereby strong internal fields may be produced in said i region for increasing the resistivity of said n layer.

2. The invention of claim 1 in which said wafer is at least two millimeters thick between said sides and applying a constant wattage reverse bias terminates with the i region at least one millimeter from said wafer side opposite to said one of said sides having said groove thereby defining a U shaped p region extending across the wafer under said i region and from one of said sides to the other of said sides around said groove and said i region.

3. The invention of claim 1 in which said chemical stabilizing, comprises removing any wax coating, cleaning said wafer with ultrasonic agitation in a solvent, drying said cleaned wafer, oxidizing said dried wafer surface, quenching said oxidized wafer in de-ionized water, drying said quenched wafer in dry nitrogen, removing said oxidized surface, and quenching said wafer in methanol.

4. An improved semi-conductor radiation detector of silicon having a p region, a lithium drifted i region, and an n region, comprising a wafer of silicon having a first plane surface and a second surface parallel thereto with a thickness of at least two millimeters between said first surface and said second surface, a first volume of said wafer having an n region on said first surface and a p region contiguous with said second surface, said n region and said p region separated by said i region with said i region terminating at a distance greater than about one millimeter from said second surface, a second volume of said wafer having a p region extending substantially from said first surface to said second surface, and a groove, defining a closed figure incised in said first surface substantially at the boundary of said first volume and said second volume, said groove extending from said first surface to about one-half the depth of said i region.

5. The invention of claim 4 in which said groove between said lithium drifted i region and said p region of silicon defining means for increasing an electrical field in said i region near the bottom of said groove in response to a reverse bias applied to said wafer.

References Cited

UNITED STATES PATENTS

| | | | |
|---|---|---|---|
| 2,994,018 | 7/1961 | Hall | 317—235 |
| 2,998,534 | 8/1961 | Pomerantz | 307—88.5 |
| 3,008,089 | 11/1961 | Uhlir | 330—5 |
| 3,110,806 | 11/1963 | Denney et al. | 250—83.3 |
| 3,113,220 | 12/1963 | Gaulding et al. | 307—88.5 |
| 3,117,229 | 1/1964 | Friedland | 250—83.3 |
| 3,355,568 | 11/1967 | Hirai et al. | 219—69 |

JAMES D. KALLAM, *Primary Examiner.*